(12) United States Patent
Chiao

(10) Patent No.: US 9,539,657 B2
(45) Date of Patent: Jan. 10, 2017

(54) DOUBLE-SAW BAND SAW MACHINE AND A METHOD FOR USING THE SAME

(71) Applicant: EVERISING MACHINE CO., Taichung (TW)

(72) Inventor: Shu-Chia Chiao, Taichung (TW)

(73) Assignee: EVERISING MACHINE CO., Taichung (TW)

( * ) Notice: Subject to any disclaimer, the term of this patent is extended or adjusted under 35 U.S.C. 154(b) by 415 days.

(21) Appl. No.: 14/140,450

(22) Filed: Dec. 24, 2013

(65) Prior Publication Data

US 2014/0216219 A1  Aug. 7, 2014

(30) Foreign Application Priority Data

Feb. 7, 2013  (TW) .............................. 102104735 A

(51) Int. Cl.
| | |
|---|---|
| B23D 53/04 | (2006.01) |
| B23D 53/06 | (2006.01) |
| B23D 55/02 | (2006.01) |
| B23D 55/04 | (2006.01) |
| B23D 53/00 | (2006.01) |
| B23D 55/08 | (2006.01) |

(52) U.S. Cl.
CPC ............ *B23D 53/005* (2013.01); *B23D 55/043* (2013.01); *B23D 55/046* (2013.01); *B23D 55/088* (2013.01); *Y10T 83/04* (2015.04); *Y10T 83/6572* (2015.04)

(58) Field of Classification Search
CPC ..... B23D 53/005; B23D 53/026; B23D 53/06; B23D 55/02; B23D 55/023; B23D 55/026; B23D 55/04; B23D 55/043; B23D 55/046; Y10T 83/7189; Y10T 83/6667; Y10T 83/6547; Y10T 83/6555; Y10T 83/6558; Y10T 83/0581
USPC ..... 82/57, 58, 89, 90, 101; 144/1.1, 2.1, 3.1, 144/48.1; 269/60, 66, 291
See application file for complete search history.

(56) References Cited

U.S. PATENT DOCUMENTS

| | | | | |
|---|---|---|---|---|
| 1,967,374 | A * | 7/1934 | Scott ...................... | B26D 3/161 221/225 |
| 4,080,858 | A * | 3/1978 | Stolzer ................. | B23D 55/043 83/247 |
| 4,927,126 | A * | 5/1990 | Hoffman ................. | B25B 1/103 269/251 |
| 5,341,712 | A * | 8/1994 | D'Arcy ................ | B23D 53/005 83/794 |
| 6,688,197 | B1 * | 2/2004 | Niemela .............. | B23D 53/001 144/28.6 |

* cited by examiner

*Primary Examiner* — Stephen Choi
*Assistant Examiner* — Evan MacFarlane
(74) *Attorney, Agent, or Firm* — Bruce Stone LLP; Joseph A. Bruce

(57) ABSTRACT

A double-saw band saw machine includes a base, a first band saw unit, a second band saw unit, a feeding unit and a clamp unit. When an object to be sawn is located in a sawing area between the first and second band saw units, the first and second motors control the first and second frames to move toward each other along the first axial direction, so that the first and second band saw blades can be used to cut the object to be sawn simultaneously. Hence, the sawing efficiency of the double-saw band saw machine is improved, and the replacement interval for the first and second band saw blades is extended.

8 Claims, 11 Drawing Sheets

DOUBLE-SAW BAND SAW MACHINE AND A METHOD FOR USING THE SAME

BACKGROUND OF THE INVENTION

Field of the Invention

The present invention relates to a band saw machine, and more particularly to a double-saw band saw machine and a method for using the same.

Description of the Prior Art

Band saw machines are used to cut metal, stone or wood into desired shapes for easy transportation.

A conventional band saw machine generally comprises: a base with a work surface, a saw stable which is mounted on the base in a manner that the saw table is horizontally slidable and spanned between two sides of the base, a band saw which is disposed on the saw table in a manner that the band saw is capable of moving in a vertical direction and includes a band saw blade. An object to be sawn is placed on the work surface, and the saw table moves horizontally and the band saw moves vertically to saw the object.

However, the conventional band saw machine is provided with only a single band saw blade, therefore, the sawing efficiency of a single band saw blade is relatively low. Furthermore, the single band saw blade needs to be replaced at a relatively short interval as compared to a double-saw band saw machine.

The present invention has arisen to mitigate and/or obviate the afore-described disadvantages.

SUMMARY OF THE INVENTION

The primary objective of the present invention is to provide a double-saw band saw machine which has a relatively high sawing efficiency and a longer saw-blade replacement interval.

To achieve the above objective, a double-saw band saw machine in accordance with the present invention comprises:

a base including a frame seat located in a first axial direction, a feeding seat which is located in a second axial direction perpendicular to the first axial direction and disposed at one side of the frame seat, and a clamp seat which is located in the second axial direction and disposed at another side of the frame seat;

a first band saw unit disposed on the frame seat and movable along the first axial direction and including a first frame slidably mounted on the frame-seat slide rails, two first rotating wheels mounted on the first frame, and a first band saw blade wound around the two first rotating wheels;

a second band saw unit being mounted on the first frame seat and movable along the first axial direction to move toward or away from the first band saw unit, the second band saw unit including a second frame slidably mounted on the frame-seat slide rails, two second rotating wheels mounted on the second frame, and a second band saw blade wound around the two second rotating wheels;

a feeding unit rotatably mounted on the feeding seat and movable along the second axial direction; and a clamp unit disposed on the clamp seat and movable along the second axial direction.

Preferably, the frame seat includes two parallel frame-seat slide rails arranged in the first axial direction, and the first and second frames are slidably mounted on the frame-seat slide rails.

Preferably, the first band saw unit includes a first motor fixed to the frame seat, a first screw driven to rotate by the first motor, and a first nut screwed on the first screw and fixed to the first frame, and the second band saw unit further includes a second motor fixed to the frame seat, a second screw driven to rotate by the second motor, and a second nut screwed on the second screw and fixed to the second frame.

Preferably, the first band saw unit further includes a first adjustment motor, a first adjustment screw rotated by the first adjustment motor, and two adjustment assemblies which are mounted on the first frame in a manner that the two adjustment assemblies can move toward or away from each other, each of the first adjustment assemblies includes two first adjustment slide rails fixed to the first frame, two first adjustment slide block slidably mounted on the first adjustment slide rails, a first guide portion disposed on the first adjustment slide rail and coming into contact with the first band saw blade, and a first adjustment nut screwed on the first adjustment screw and fixed to the first adjustment slide block, the second band saw unit further includes a second adjustment motor, a second adjustment screw rotated by the second adjustment motor, and two adjustment assemblies which are mounted on the second frame in a manner that the two adjustment assemblies can move toward or away from each other, and each of the second adjustment assemblies includes two second adjustment slide rails fixed to the second frame, two second adjustment slide block slidably mounted on the second adjustment slide rails, a second guide portion disposed on the second adjustment slide rail and coming into contact with the second band saw blade, and a second adjustment nut screwed on the second adjustment screw and fixed to the second adjustment slide block.

Preferably, the feeding unit includes a feeding slide block slidably disposed on the feeding seat, a feeding table rotatably disposed on the feeding slide block, and a carrier which is disposed on the feeding table and capable of moving up and down, the clamp unit includes a clamp slide block slidably disposed on the clamp seat, a clamp table fixed to the clamp slide block, and a clamp device rotatably disposed on the clamp table.

Preferably, the feeding unit further comprises two parallel feeding slide rails for slidably mounting of the feeding slide block, a feeding motor fixed to the feeding seat, a feeding screw rotated by the feeding motor, and a feeding nut screwed on the feeding screw and fixed to the feeding slide block.

Preferably, the clamp unit further includes three parallel clamp slide rails disposed on the clamp seat for slidably mounting of the clamp slide block, a clamp motor fixed to the clamp seat, a clamp screw rotated by the clamp motor, and a clamp nut screwed on the clamp screw and fixed to the clamp slide block.

Preferably, the carrier includes two parallel carrying slide rails mounted on the feeding table, a carrying slide block which is slidably disposed on the carrying slide rails and has a pushing portion, a carrying motor fixed to the feeding table, a carrying screw rotated by the carrying motor, and a carrying nut screwed on the carrying screw and fixed to the carrying slide block.

Preferably, the clamp device includes a clamp disc rotatably disposed on the clamp table, and a plurality of clamp paws which are equiangularly disposed on the clamp disc and capable of moving toward or away from the center of the clamp disc.

A method for sawing an object by using the double-saw band saw machine as claimed in claim comprises the following continuous steps:

using the feeding unit to rotate the object and drive the object to move along the second axial direction toward the clamp unit;

measuring the inner and outer diameters of the object to be sawn, then putting the object on the clamp unit;

releasing the object from the feeding unit, and moving the feeding unit out of the cutting area between the first and second band saw units; and moving the clamp unit toward the feeding unit along the second axial direction to make the object stay in the cutting area between the first and second band saw units, then making the first and second band saw units move toward and away from each other by moving along the first axial direction, so as to saw the object.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
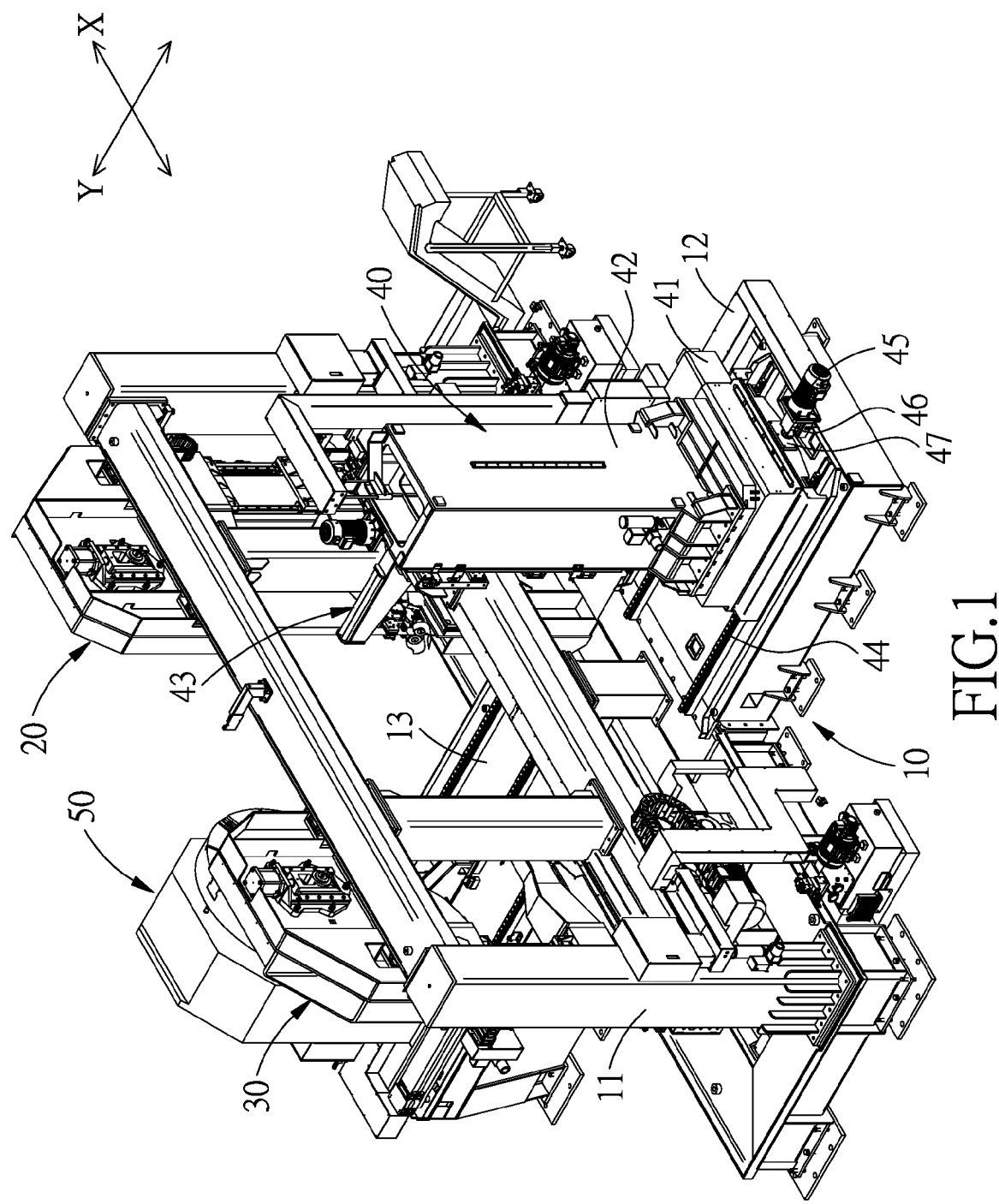
FIG. 1 is an assembly view of a double-saw band saw machine in accordance with the present invention.
Figure 2:
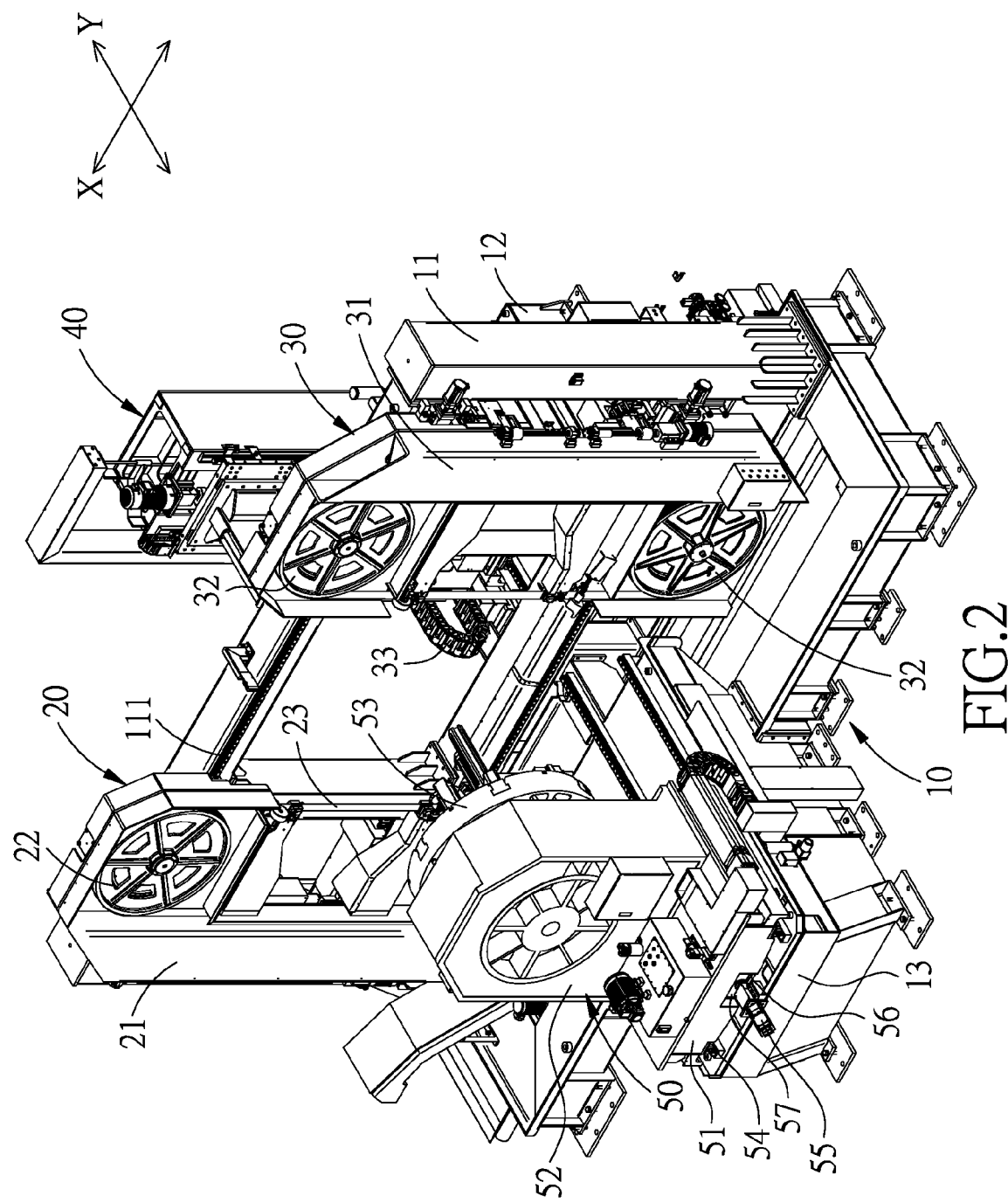
FIG. 2 is another assembly view of the double-saw band saw machine in accordance with the present invention.

Referring to FIGS. 1 and 2, a double-saw band saw machine in accordance with the present invention comprises: a base 10, a first band saw unit 20, a second band saw unit 30, a feeding unit 40 and a clamp unit 50.

The base 10 includes a frame seat 11 located in a first axial direction X, a feeding seat 12 which is located in a second axial direction Y perpendicular to the first axial direction X and disposed at one side of the frame seat 11, and a clamp seat 13 which is located in the second axial direction Y and disposed at another side of the frame seat 11. In this embodiment, the frame seat 11 includes two parallel frame-seat slide rails 111 arranged in the first axial direction X.

Figure 3:
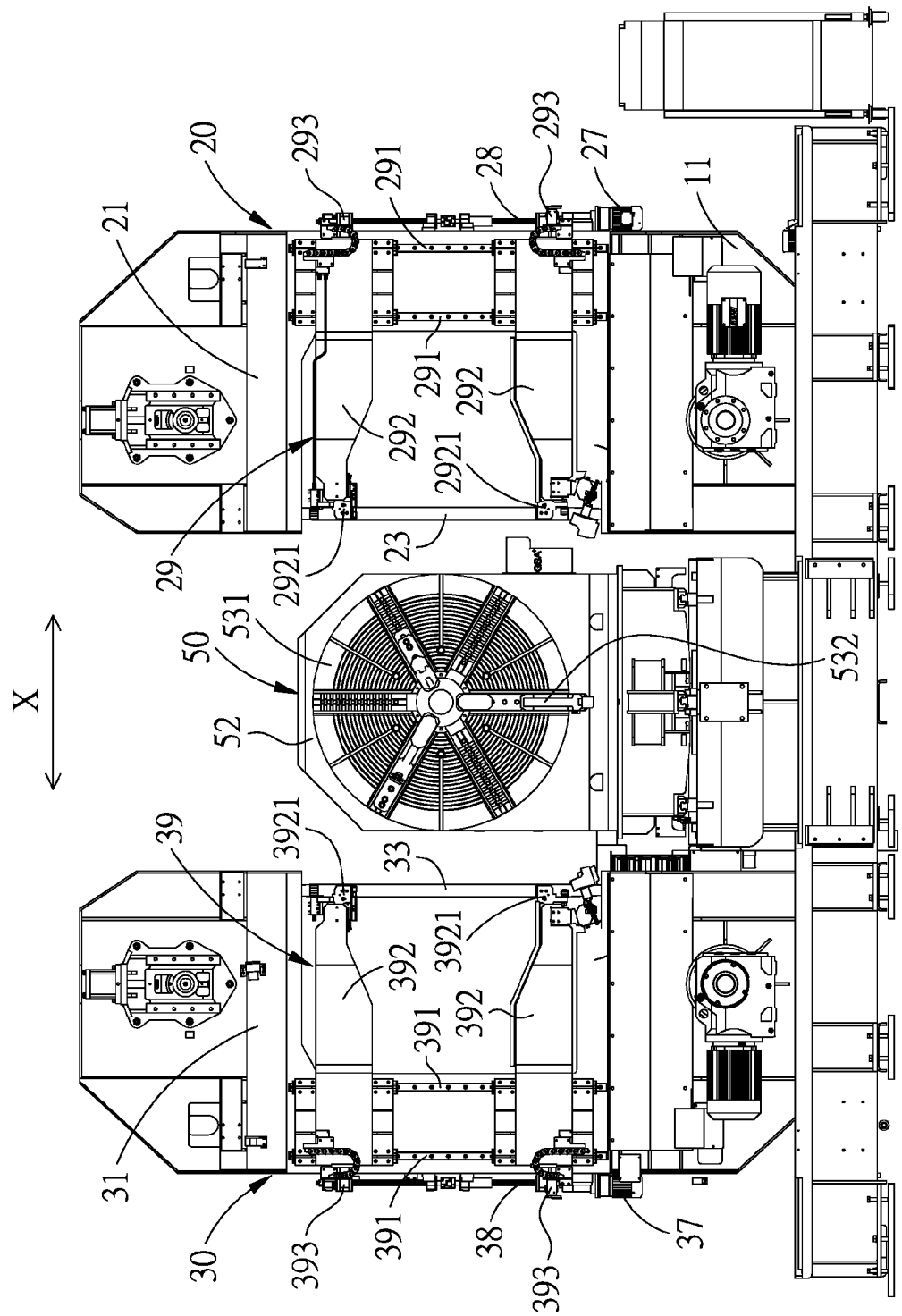
FIG. 3 is a side view of the double-saw band saw machine in accordance with the present invention.
Figure 9:
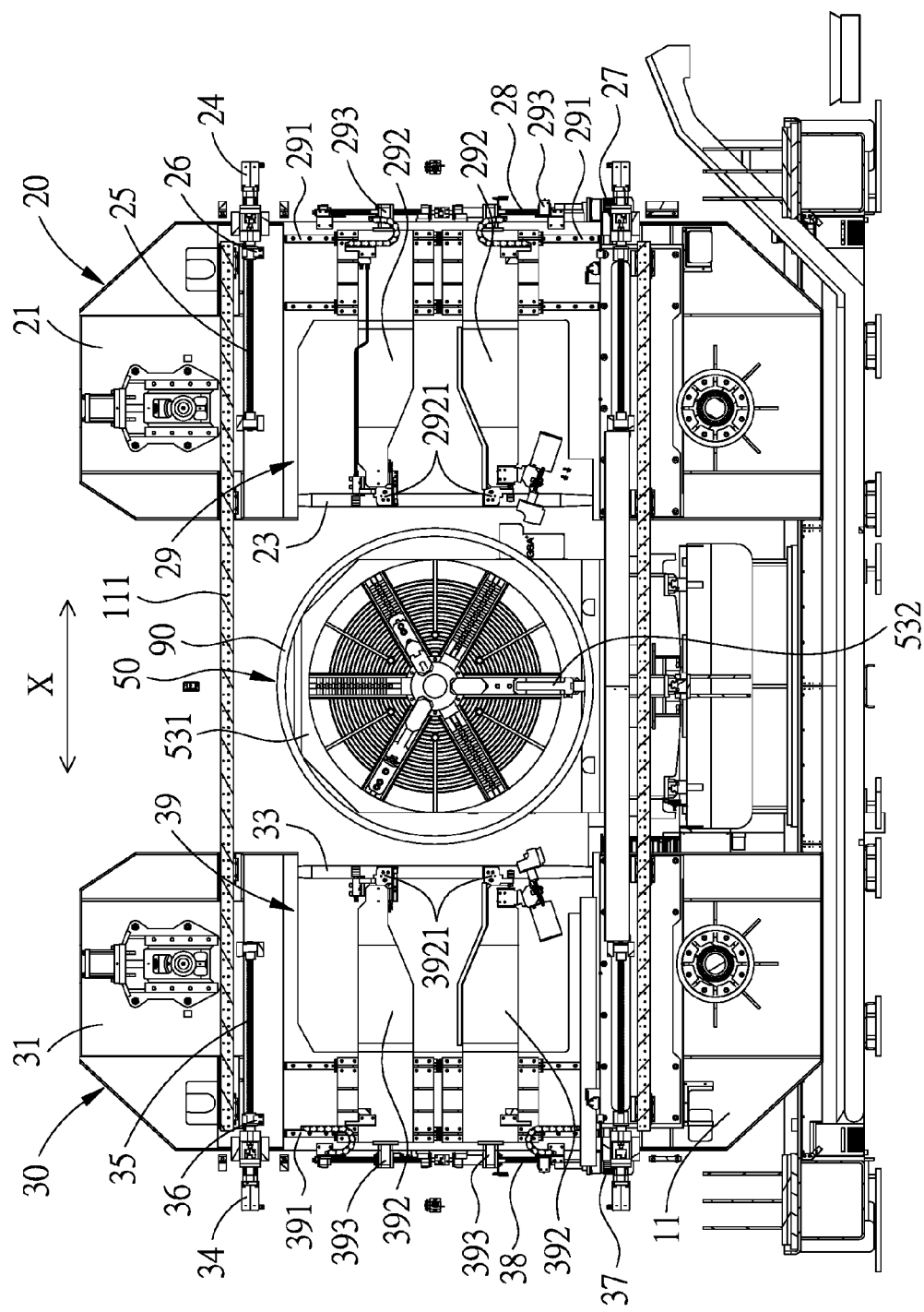
FIG. 9 shows the state of the first and second band saw units of the present invention before the object is sawn.

Referring then to FIGS. 2, 3 and 9, the first band saw unit 20 is disposed on the frame seat 11 and movable along the first axial direction X and includes a first frame 21 slidably mounted on the frame-seat slide rails 111, two first rotating wheels 22 mounted on the first frame 21, and a first band saw blade 23 wound around the two first rotating wheels 22. In this embodiment, the first band saw unit 20 includes two first motors 24 fixed to the frame seat 11, two first screws 25 driven to rotate by the first motor 24, and two first nuts 26 screwed on the first screws 25 and fixed to the first frame 21, so that, when the first motors 24 rotate, the first frame 21 can be driven to move back and forth along the first axial direction X.

The first band saw unit 20 further includes a first adjustment motor 27, a first adjustment screw 28 rotated by the first adjustment motor 27, and two first adjustment assemblies 29 which are mounted on the first frame 21 in a manner that the two first adjustment assemblies 29 can move toward or away from each other. Each of the first adjustment assemblies 29 includes two first adjustment slide rails 291 fixed to the first frame 21, two first adjustment slide blocks 292 slidably mounted on the first adjustment slide rails 291, two first guide portion 2921 which are disposed on the first adjustment slide blocks 292 and come into contact with the first band saw blade 23, and a first adjustment nut 293 screwed on the first adjustment screw 28 and fixed to the first adjustment slide block 292. The first adjustment motor 27 cab be used to control the tension of the first band saw blade 23 by driving the two first adjustment slide blocks 292 to move toward and away from each other.

The second band saw unit 30 is mounted on the frame seat 11 and movable along the first axial direction X to move toward or away from the first band saw unit 20. The second band saw unit 30 includes a second frame 31 slidably mounted on the frame-seat slide rails 111, two second rotating wheels 32 mounted on the second frame 31, and a second band saw blade 33 wound around the two second rotating wheels 32. In this embodiment, the second band saw unit 30 further includes a second motor 34 fixed to the frame seat 11, a second screw 35 driven to rotate by the second motor 34, and a second nut 36 screwed on the second screw 35 and fixed to the second frame 31, so that, when the second motor 34 rotates, the second frame 31 can be driven to move toward or away from the first band saw unit 20 along the first axial direction X.

The second band saw unit 30 further includes a second adjustment motor 37, a second adjustment screw 38 rotated by the second adjustment motor 37, and two adjustment assemblies 39 which are mounted on the second frame 31 in a manner that the two adjustment assemblies 39 can move toward or away from each other. Each of the second adjustment assemblies 39 includes two second adjustment slide rails 391 fixed to the second frame 31, two second adjustment slide blocks 392 slidably mounted on the second adjustment slide rails 391, two second guide portions 3921 which are disposed on the second adjustment slide blocks 392 and come into contact with the second band saw blade 33, and a second adjustment nut 393 screwed on the second adjustment screw 38 and fixed to the second adjustment slide block 392. The second adjustment motor 37 cab be used to control the tension of the second band saw blade 33 by driving the two second adjustment slide blocks 392 to move toward and away from each other.

Figure 4:
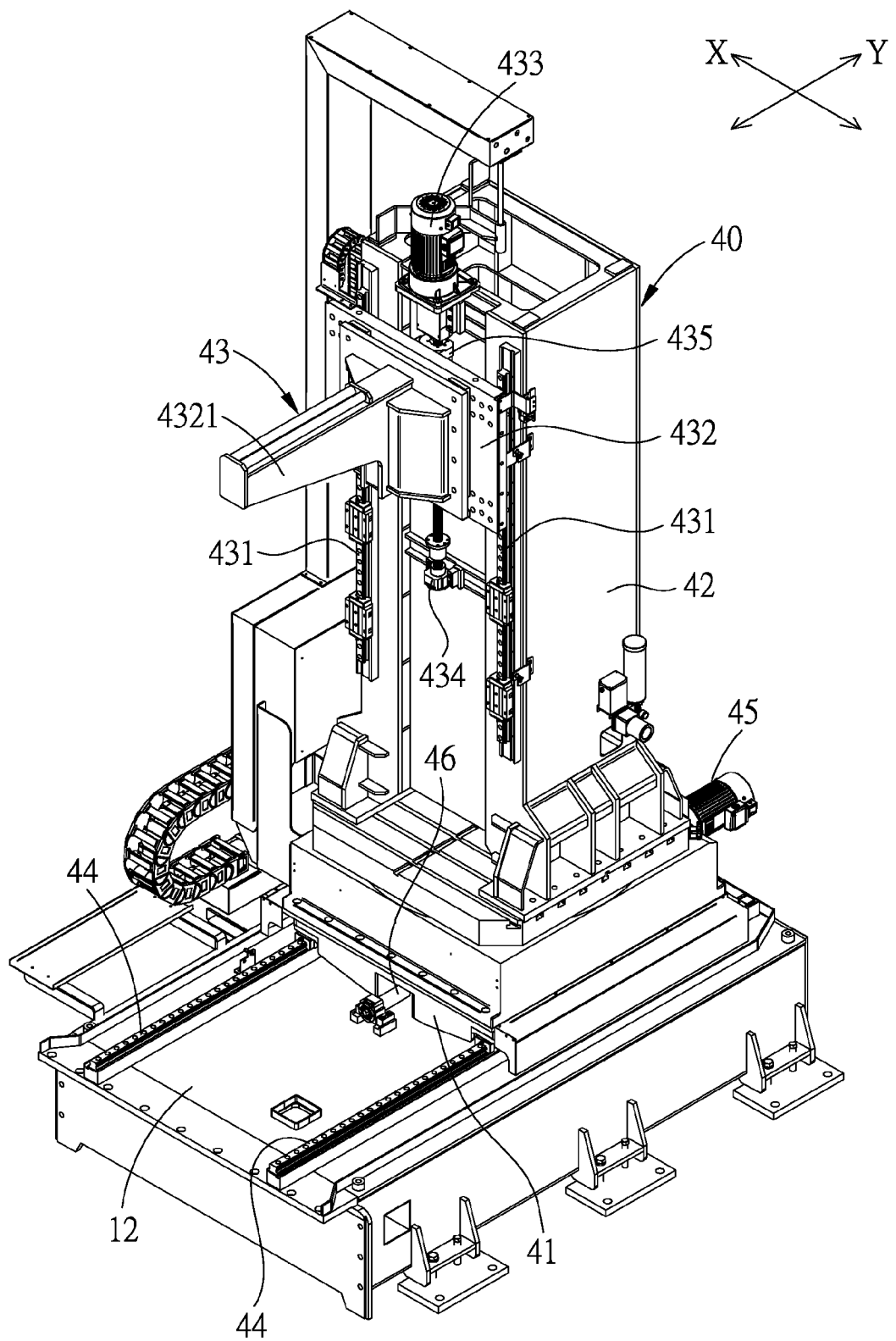
FIG. 4 shows the feeding unit of the double-saw band saw machine in accordance with the present invention.

Referring then to FIGS. 1 and 4, the feeding unit 40 is rotatably mounted on the feeding seat 12 and movable along the second axial direction Y. In this embodiment, the feeding unit 40 includes a feeding slide block 41 slidably disposed on the feeding seat 12, a feeding table 42 rotatably disposed on the feeding slide block 41, and a carrier 43 which is disposed on the feeding table 42 and capable of moving up and down. The feeding unit 40 further comprises two parallel feeding slide rails 44 for slidably mounting of the feeding slide block 41, a feeding motor 45 fixed to the feeding seat 12, a feeding screw 46 rotated by the feeding motor 45, and a feeding nut 47 screwed on the feeding screw 46 and fixed to the feeding slide block 41. By such arrangements, the feeding motor 45 can drive the feeding slide block 41 to move back and forth along the second axial direction Y.

The carrier 43 of the feeding unit 40 includes two parallel carrying slide rails 431 mounted on the feeding table 42, a carrying slide block 432 which is slidably disposed on the carrying slide rails 431 and has a pushing portion 4321, a carrying motor 433 fixed to the feeding table 42, a carrying screw 434 rotated by the carrying motor 433, and a carrying nut 435 screwed on the carrying screw 434 and fixed to the carrying slide block 432. By such arrangements, the carrying motor 433 can drive the carrying slide block 432 to move up and down.

Figure 5:
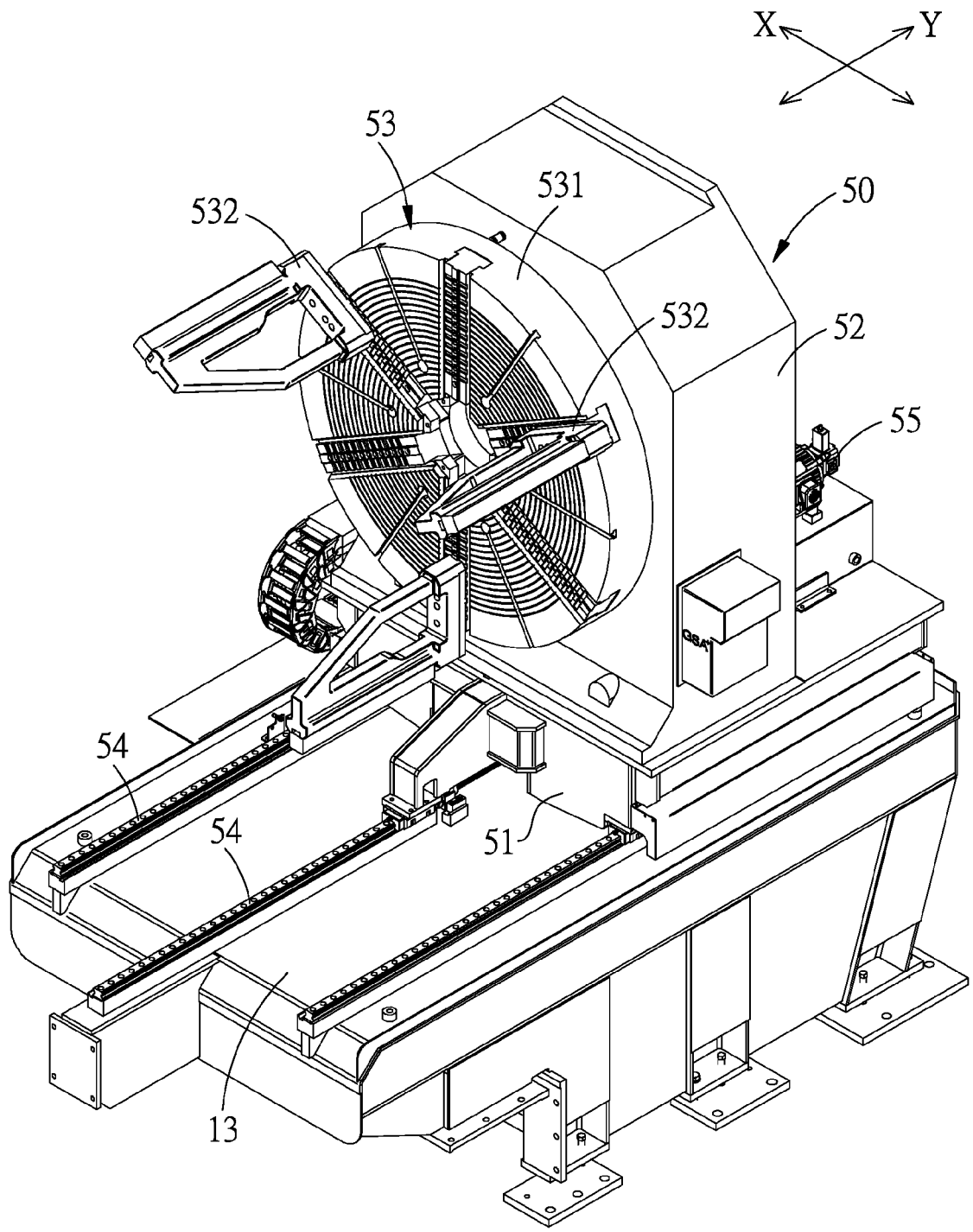
FIG. 5 shows the clamp unit of the double-saw band saw machine in accordance with the present invention.
Figure 6:
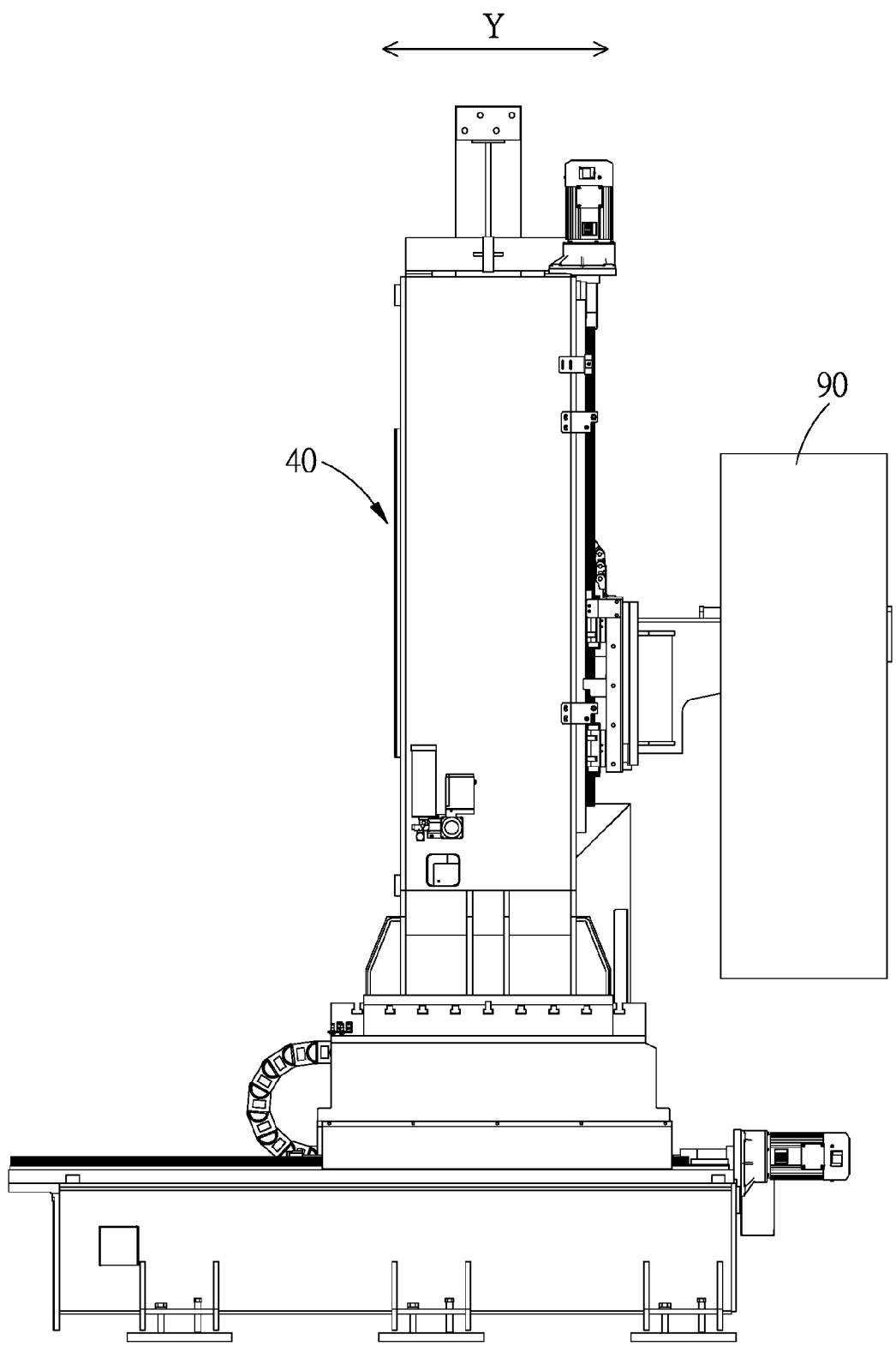
FIG. 6 shows that an object to be sawn is put on the feeding unit of the double-saw band saw machine in accordance with the present invention.

Referring then to FIGS. 2 and 5, the clamp unit 50 is disposed on the clamp seat 13 and movable along the second axial direction Y. In this embodiment, the clamp unit 50 includes a clamp slide block 51 slidably disposed on the clamp seat 13, a clamp table 52 fixed to the clamp slide block 51, and a clamp device 53 rotatably disposed on the clamp table 52. The clamp unit 50 further includes three parallel clamp slide rails 54 disposed on the clamp seat 13 for slidably mounting of the clamp slide block 51, a clamp motor 55 fixed to the clamp seat 13, a clamp screw 56 rotated by the clamp motor 55, and a clamp nut 57 screwed on the clamp screw 56 and fixed to the clamp slide block 51. By such arrangements, the clamp motor 55 can drive the clamp slide block 51 to move back and forth along the second axial direction Y.

The clamp device 53 includes a clamp disc 531 rotatably disposed on the clamp table 52, and a plurality of clamp paws 532 which are equiangularly disposed on the clamp disc 531 and capable of moving toward or away from the center of the clamp disc 531.

Figure 7:
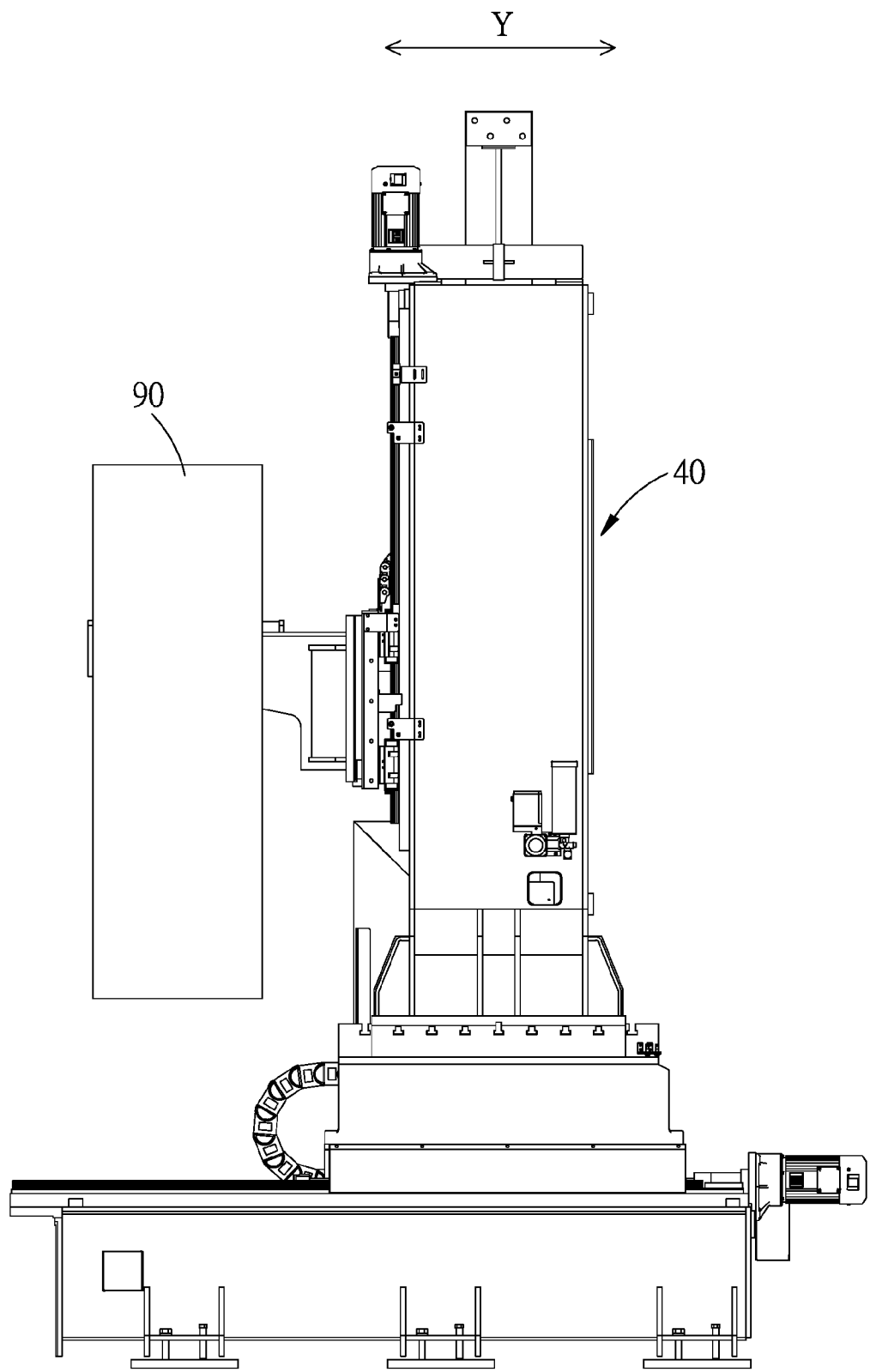
FIG. 7 shows that the object to be sawn is rotated an angle by the feeding unit of the double-saw band saw machine in accordance with the present invention.
Figure 8:
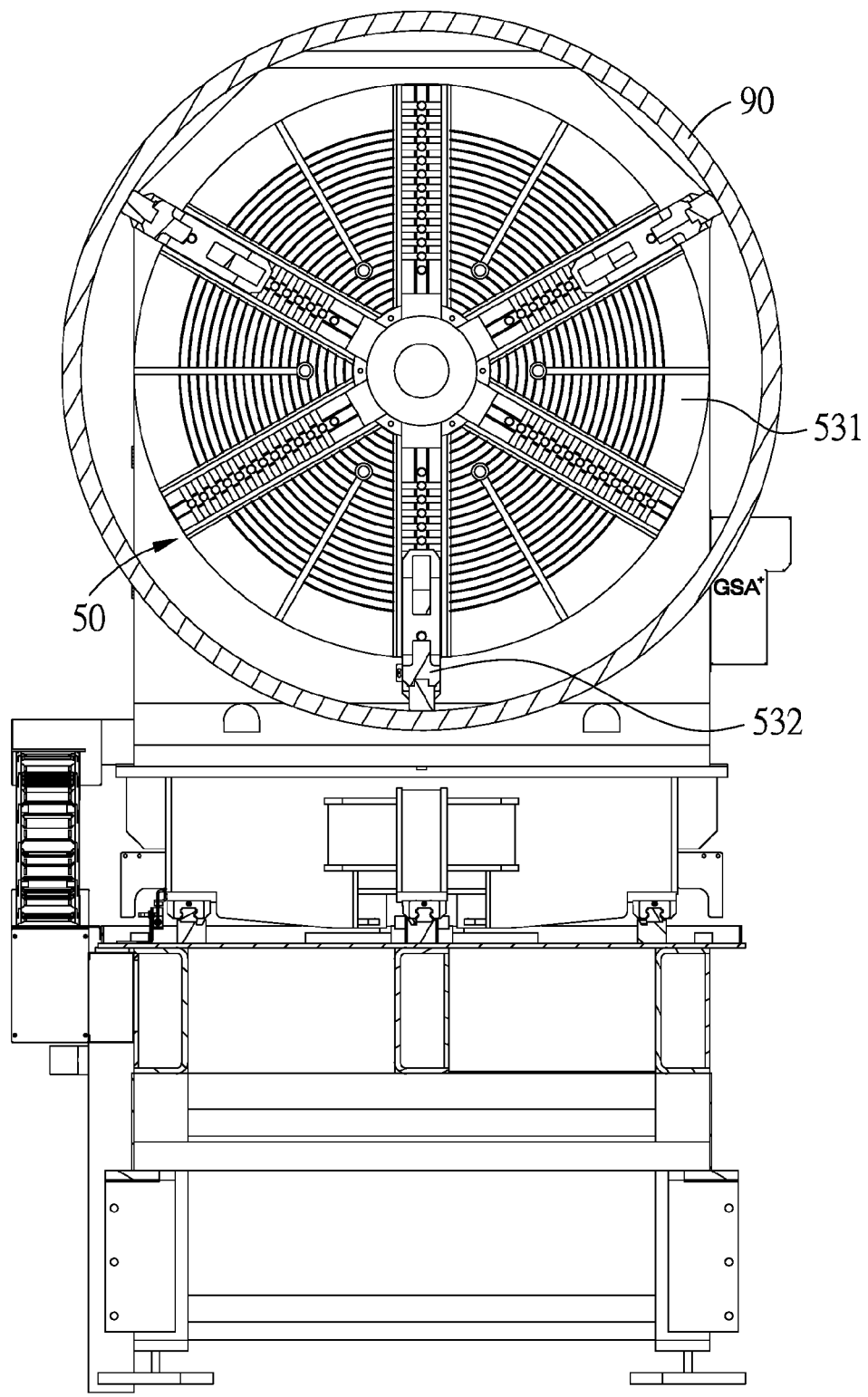
FIG. 8 shows that the object to be sawn is positioned on the clamp unit of the double-saw band saw machine in accordance with the present invention.

Referring to FIGS. 7-9, an object 90 to be sawn is moved to and positioned on the clamp unit 50 by the feeding unit 40, when the object 90 to be sawn is located in a sawing area between the first and second band saw units 20, 30, the first and second motors 24, 34 control the first and second frames 21, 31 to move toward each other along the first axial direction X, so that the first and second band saw blades 23, 33 can be used to cut the object 90 to be sawn simultaneously. Hence, the sawing efficiency of the double-saw band saw machine in accordance with the present invention is improved, and the replacement interval for the first and second band saw blades 23, 33 is extended.

Referring then to FIGS. 6-11, a method for cutting an object by using the double-saw band saw machine in accordance with the present invention comprises the following continuous steps:

Carrying step 61: using the feeding unit 40 to rotate the object 90 and drive the object 90 to move along the second axial direction Y toward the clamp unit 50.

Parameter inputting step 62: measuring the inner and outer diameters of the object 90 to be sawn, then putting the object 90 on the clamp unit 50. In this embodiment, the inner and outer diameters of the object 90 are measured automatically.

Step 63 of releasing: releasing the object 90 from the feeding unit 40, and moving the feeding unit 40 out of the cutting area between the first and second band saw units 20, 30.

Figure 10:
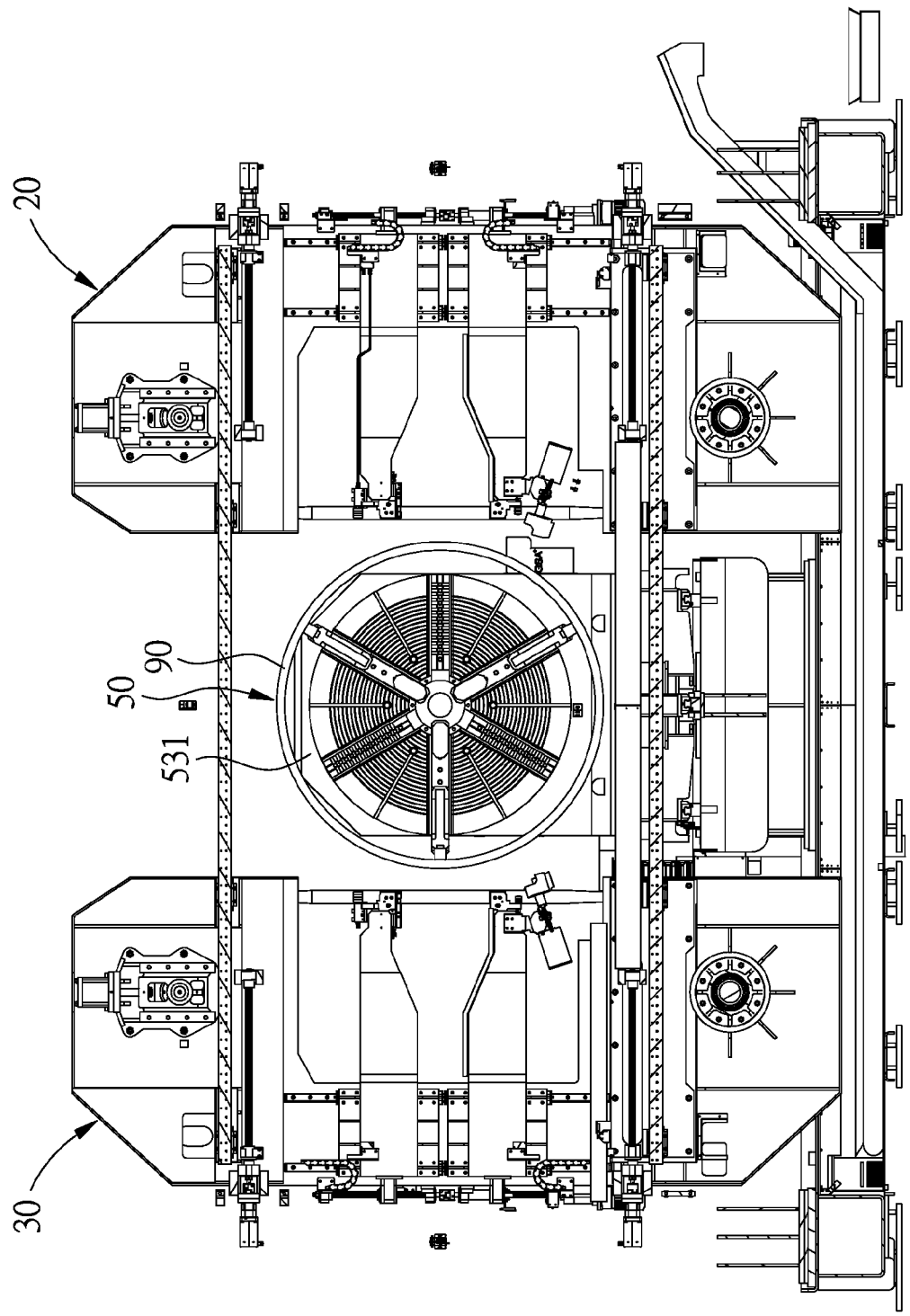
FIG. 10 shows that the object to be sawn is rotated an angle by the clamp disc of the double-saw band saw machine in accordance with the present invention.
Figure 11:
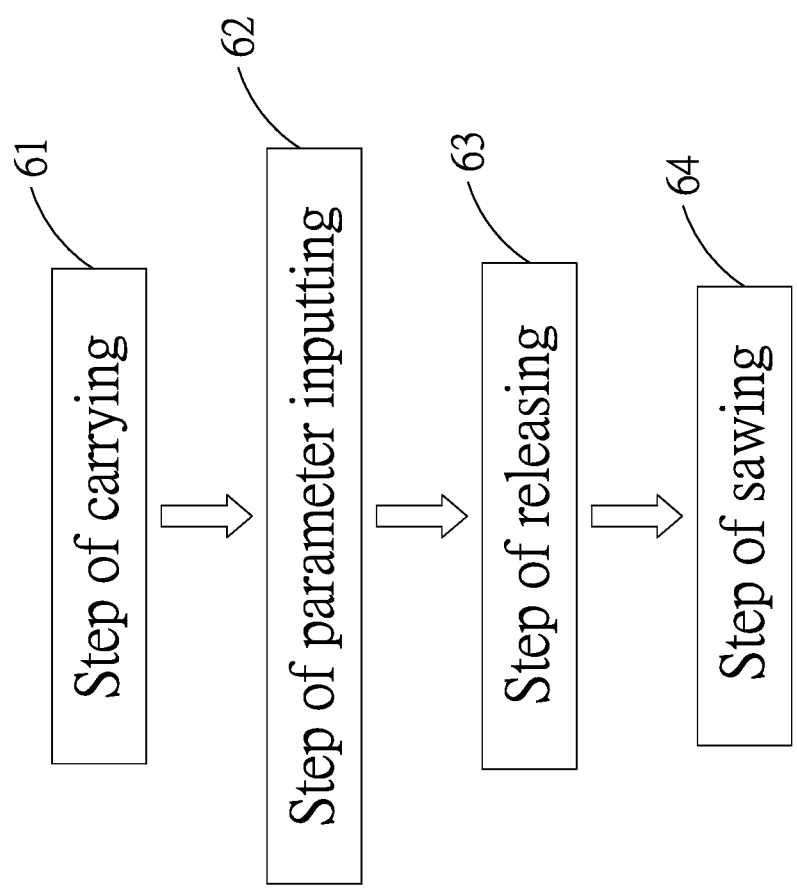
FIG. 11 is a flow chart showing the steps of the sawing method for cutting an object by using the double-saw band saw machine in accordance with the present invention.

Step 64 of sawing: moving the clamp unit 50 toward the feeding unit 40 along the second axial direction Y to make the object 90 stay in the cutting area between the first and second band saw units 20, 30, then making the first and second band saw units 20, 30 move toward and away from each other by moving along the first axial direction X, so as to saw the object 90, meanwhile, the clamp disc 531 of the clamp unit 50 rotates to assist in sawing the object 90. As shown in FIG. 10, the object 90 is rotated an angle by the clamp disc 531.

While we have shown and described various embodiments in accordance with the present invention, it is clear to those skilled in the art that further embodiments may be made without departing from the scope of the present invention.

What is claimed is:

1. A double-saw band saw machine comprising:
a base including a frame seat located in a first axial direction, a feeding seat which is located in a second axial direction perpendicular to the first axial direction and disposed at one side of the frame seat, and a clamp seat which is located in the second axial direction and disposed at another side of the frame seat;
a first band saw unit disposed on the frame seat and movable along the first axial direction and including a first frame slidably mounted on the frame seat, two first rotating wheels mounted on the first frame, and a first band saw blade wound around the two first rotating wheels;
a second band saw unit being mounted on the frame seat and movable along the first axial direction to move toward or away from the first band saw unit, the second band saw unit including a second frame slidably mounted on the frame seat, two second rotating wheels mounted on the second frame, and a second band saw blade wound around the two second rotating wheels;
a feeding unit rotatably mounted on the feeding seat and movable along the second axial direction; and
a clamp unit disposed on the clamp seat and movable along the second axial direction;
wherein the feeding unit includes a feeding slide block slidably disposed on the feeding seat, a feeding table rotatably disposed on the feeding slide block, and a carrier which is disposed on the feeding table and capable of moving up and down, the clamp unit includes a clamp slide block slidably disposed on the clamp seat, a clamp table fixed to the clamp slide block, and a clamp device rotatably disposed on the clamp table, the feeding unit further comprises two parallel feeding slide rails for slidably mounting of the feeding slide block, a feeding motor fixed to the feeding seat, a feeding screw rotated by the feeding motor, and a feeding nut screwed on the feeding screw and fixed to the feeding slide block.

2. The double-saw band saw machine as claimed in claim 1, wherein the frame seat includes two parallel frame-seat slide rails arranged in the first axial direction, and the first and second frames are slidably mounted on the frame-seat slide rails.

3. The double-saw band saw machine as claimed in claim 1, wherein the first band saw unit includes at least one first motor fixed to the frame seat, a first screw driven to rotate by the first motor, and a first nut screwed on the first screw and fixed to the first frame, and the second band saw unit further includes a second motor fixed to the frame seat, a second screw driven to rotate by the second motor, and a second nut screwed on the second screw and fixed to the second frame.

4. The double-saw band saw machine as claimed in claim 1, wherein the first band saw unit further includes a first adjustment motor, a first adjustment screw rotated by the first adjustment motor, and two first adjustment assemblies which are mounted on the first frame in a manner that the two first adjustment assemblies can move toward or away from each other, each of the first adjustment assemblies includes two first adjustment slide rails fixed to the first frame, a first adjustment slide block slidably mounted on the first adjustment slide rails, a first guide portion disposed on the first adjustment slide block and coming into contact with the first band saw blade, and a first adjustment nut screwed on the first adjustment screw and fixed to the first adjustment slide block, the second band saw unit further includes a second adjustment motor, a second adjustment screw rotated by the second adjustment motor, and two second adjustment assemblies which are mounted on the second frame in a manner that the two second adjustment assemblies can move toward or away from each other, and each of the second adjustment assemblies includes a second adjustment slide rails fixed to the second frame, two second adjustment slide block slidably mounted on the second adjustment slide block, a second guide portion disposed on the second adjustment slide rail and coming into contact with the second band saw blade, and a second adjustment nut screwed on the second adjustment screw and fixed to the second adjustment slide block.

5. The double-saw band saw machine as claimed in claim 1, wherein the clamp unit further includes three parallel clamp slide rails disposed on the clamp seat for slidably mounting of the clamp slide block, a clamp motor fixed to the clamp seat, a clamp screw rotated by the clamp motor, and a clamp nut screwed on the clamp screw and fixed to the clamp slide block.

6. The double-saw band saw machine as claimed in claim 1, wherein the carrier includes two parallel carrying slide rails mounted on the feeding table, a carrying slide block which is slidably disposed on the carrying slide rails and has a pushing portion, a carrying motor fixed to the feeding table, a carrying screw rotated by the carrying motor, and a carrying nut screwed on the carrying screw and fixed to the carrying slide block.

7. The double-saw band saw machine as claimed in claim 1, wherein the clamp device includes a clamp disc rotatably disposed on the clamp table, and a plurality of clamp paws which are equiangularly disposed on the clamp disc and capable of moving toward or away from the center of the clamp disc.

8. A method for sawing an object by using the double-saw band saw machine as claimed in claim 1 comprising the following continuous steps:
   using the feeding unit to rotate the object and drive the object to move along the second axial direction toward the clamp unit;
   measuring the inner and outer diameters of the object to be sawn, then putting the object on the clamp unit;
   releasing the object from the feeding unit, and moving the feeding unit out of a cutting area between the first and second band saw units; and
   moving the clamp unit toward the feeding unit along the second axial direction to make the object stay in the cutting area between the first and second band saw units, then making the first and second band saw units move toward and away from each other by moving along the first axial direction, so as to saw the object.

* * * * *